United States Patent
Wood

[19]

[11] Patent Number: 6,053,741
[45] Date of Patent: Apr. 25, 2000

[54] FLASH CARD HOLDER AND LEARNING METHOD

[75] Inventor: Michael C. Wood, Orinda, Calif.

[73] Assignee: Knowledge Kids Enterprises, Inc.

[21] Appl. No.: 09/100,144

[22] Filed: Jun. 18, 1998

[51] Int. Cl.⁷ .................................................. G09B 3/00
[52] U.S. Cl. ...................... 434/348; 434/322; 434/327; 434/331; 434/349
[58] Field of Search .................... 434/332, 331, 434/348, 349, 409

[56] References Cited

U.S. PATENT DOCUMENTS

| | | | |
|---|---|---|---|
| 1,816,760 | 7/1931 | Barnowitz . | |
| 2,503,130 | 8/1950 | Poritz | 434/349 |
| 2,693,646 | 11/1954 | Hawkins | 434/348 |
| 3,093,913 | 6/1963 | Wyllie | 434/349 |
| 3,100,942 | 8/1963 | Godcharles | 434/349 |
| 3,174,231 | 3/1965 | Schure | 434/331 |
| 3,248,050 | 4/1966 | Dickson | 235/89 |
| 3,251,141 | 5/1966 | MacRae . | |
| 3,696,526 | 10/1972 | Roeder et al. | 434/348 |
| 4,288,936 | 9/1981 | Okutsu . | |
| 4,731,027 | 3/1988 | Phinney | 434/348 |
| 4,770,638 | 9/1988 | Jabour et al. . | |
| 5,112,229 | 5/1992 | Gilano et al. . | |
| 5,186,631 | 2/1993 | Okutsu | 434/409 |
| 5,277,587 | 1/1994 | Aiken et al. | 434/333 |
| 5,314,197 | 5/1994 | Hersch . | |
| 5,478,084 | 12/1995 | Itkis . | |

Primary Examiner—Robert A. Hafer
Assistant Examiner—Bena B. Miller
Attorney, Agent, or Firm—Coudert Brothers

[57] ABSTRACT

A learning device comprises a receptacle for holding an information bearing card. The information bearing cards include a problem and a coded answer. The receptacle of the learning device includes a decoding display window with a movable writing screen which may be moved to cover or uncover the decoding display window. The user can insert the information bearing cards into the receptacle, write down a response on the writing screen with the display window covered, and compare their response with the correct answer by moving the movable writing screen to reveal the decoded answer through the decoding display window.

17 Claims, 5 Drawing Sheets

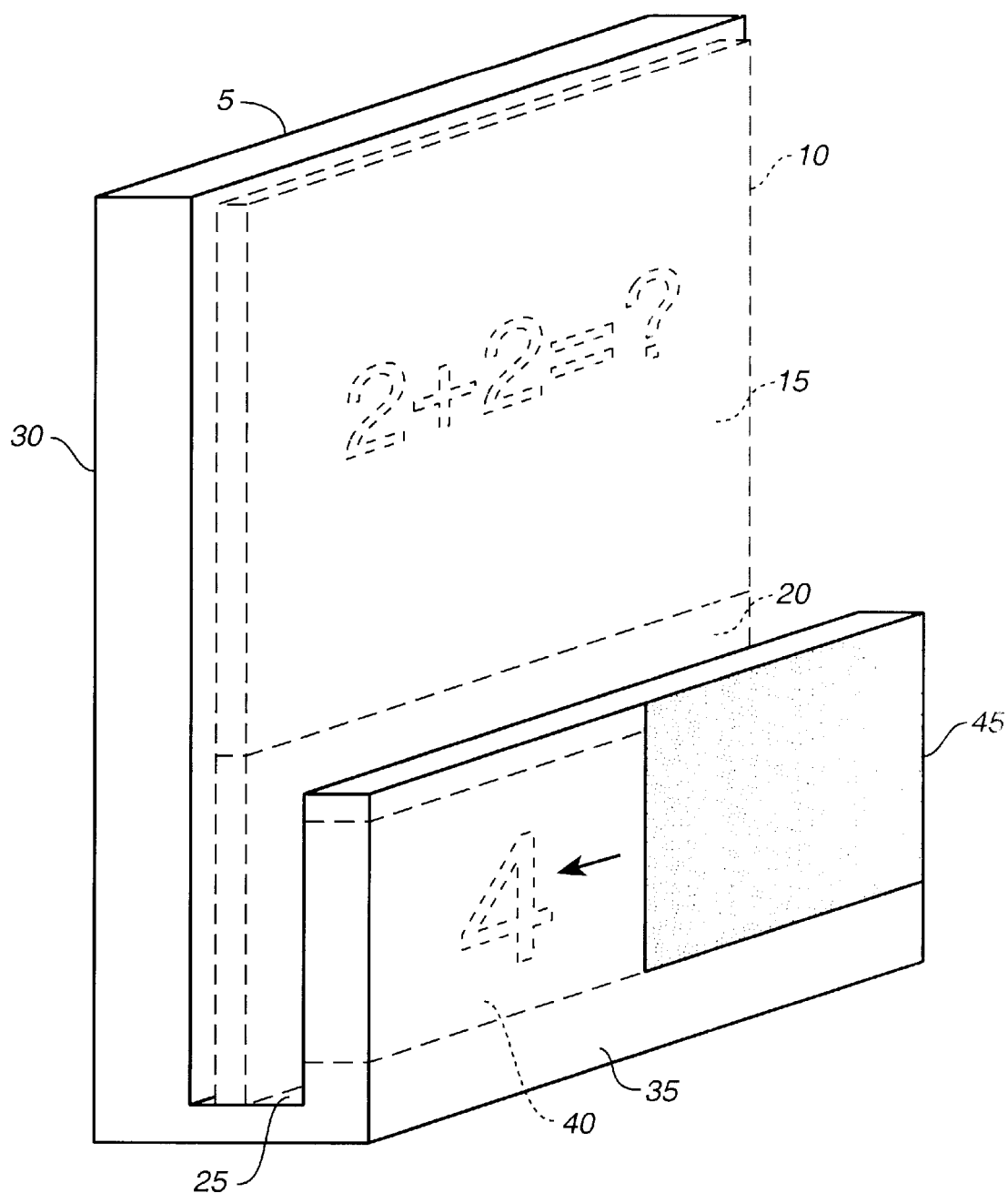
FIG._1

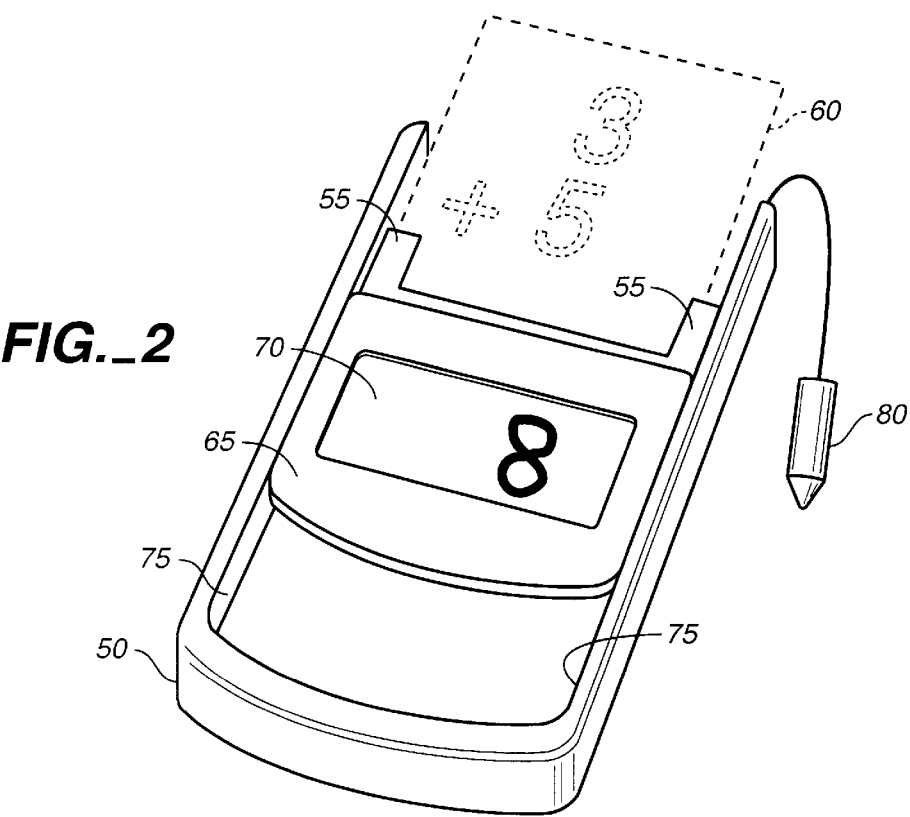
FIG._2
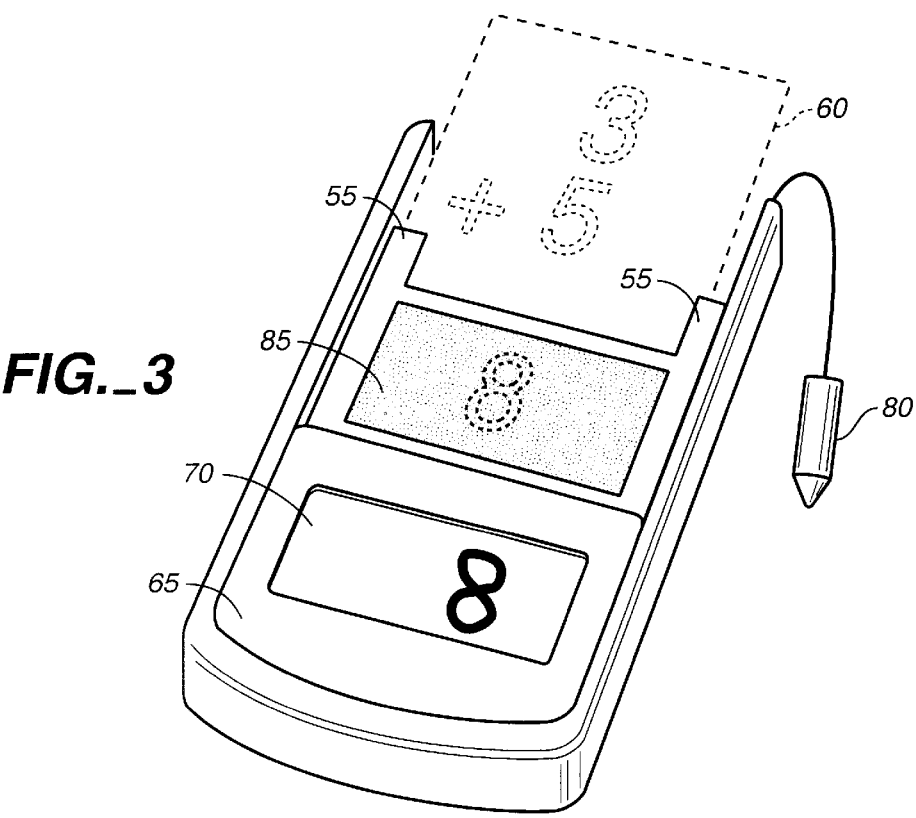
FIG._3

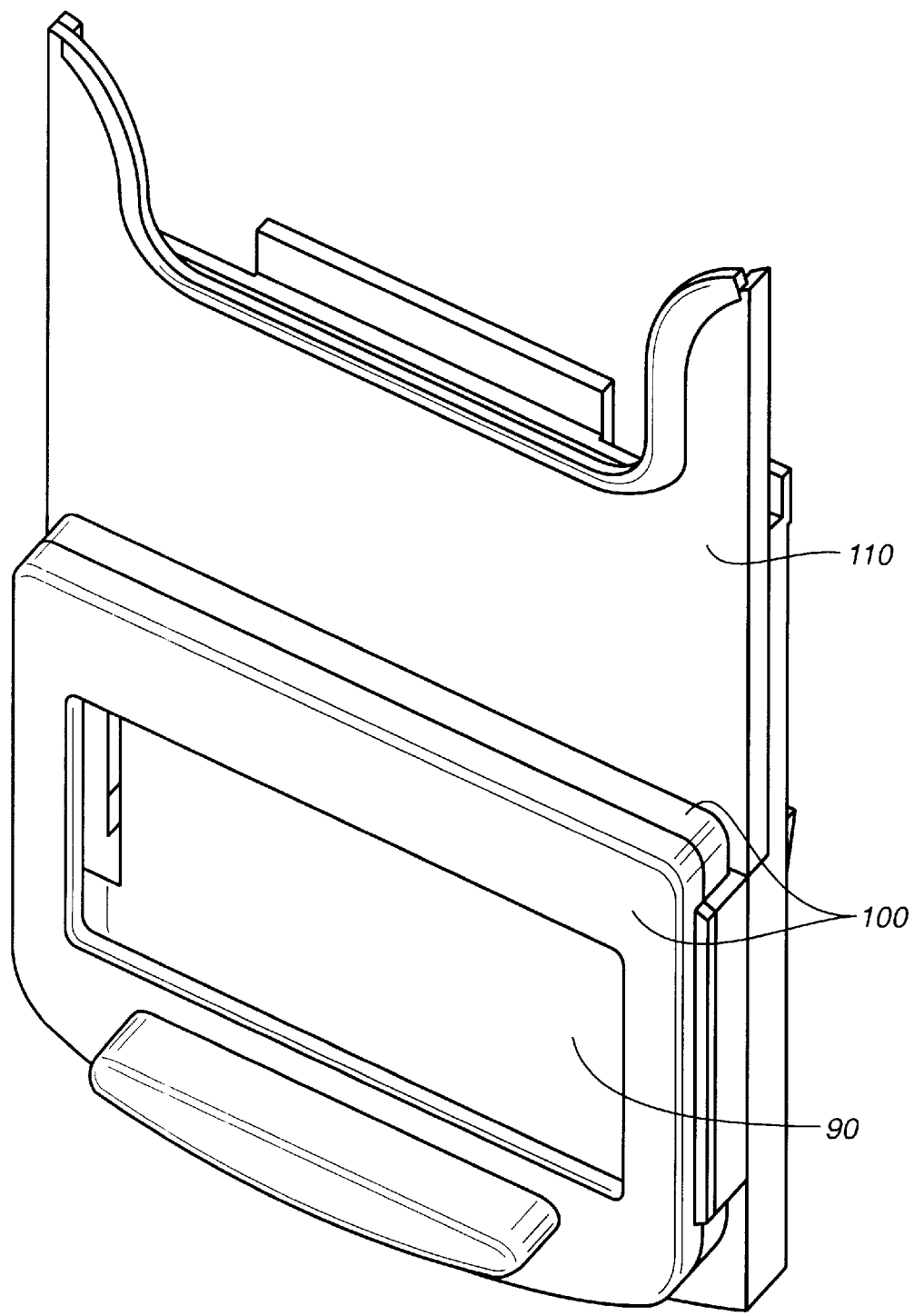
FIG._4

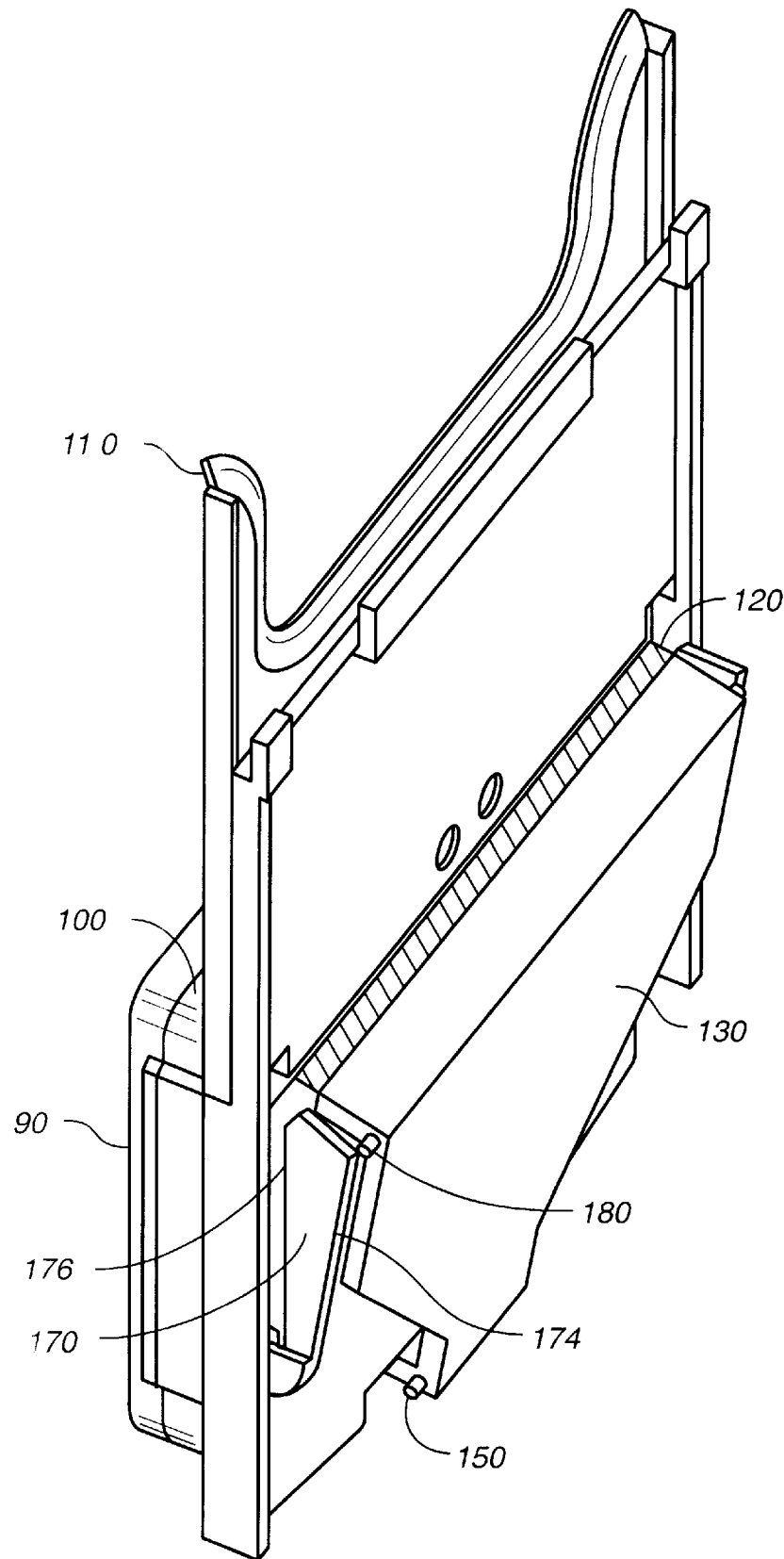
FIG._5

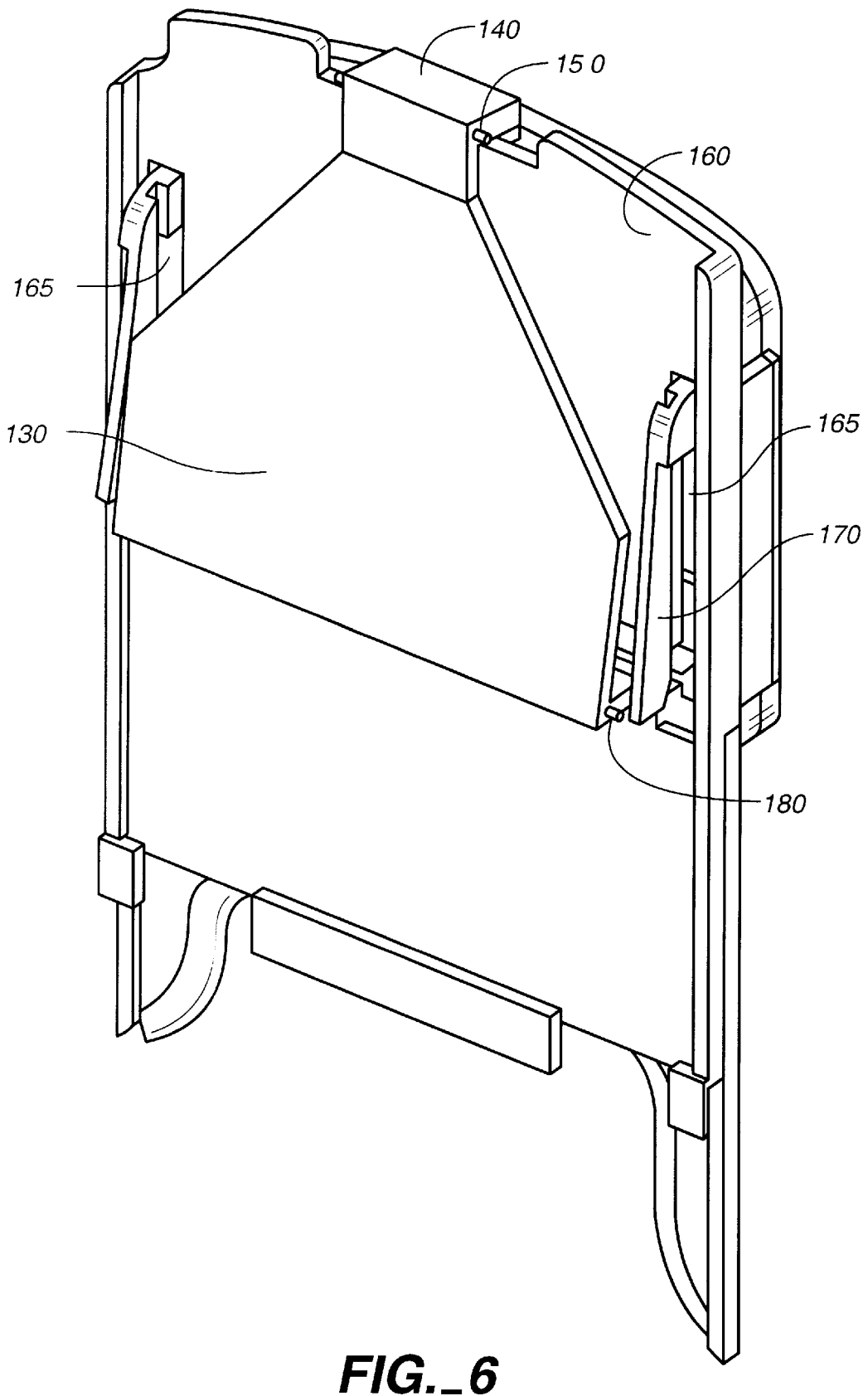
FIG._6

FLASH CARD HOLDER AND LEARNING METHOD

FIELD OF THE INVENTION

This invention relates to educational toys and devices in general and to flash cards in particular.

BACKGROUND OF THE INVENTION

It is important that children develop basic mathematical skills at an early age. One important mathematical skill is the ability to count. Children in the age range of four-to-five are generally expected to be able to count to one-hundred by the end of kindergarten. In between kindergarten and second grade, children are expected to learn how to add and subtract. By the end of third grade, children are commonly expected to learn basic multiplication skills.

It is desirable to have learning games and toys that reinforce basic mathematical skills. Flash cards are one common technique to teach children how to add numbers. The exact beginning of the use of flash cards as an educational method is not known, but is probably at least a hundred years old. Variations on flash cards, such as writing questions and answers on a piece of slate, may be even older. Flash cards commonly have an arithmetic question printed on one side (e.g., "2+2=?") and an arithmetic answer printed on the other side (e.g., "4").

It is well-known that traditional flash cards are a comparatively poor self-learning method for many small children. One problem is that small children typically have an extremely limited attention span (e.g., less than five minutes for pre-school children). Consequently, small children may become easily bored when they use traditional flash cards. Also, small children may become easily distracted such that they "forget" their answer before flipping over the flash card to reveal the correct answer. Additionally, children less than 6 years old have limited fine motor skills, which may make it easy for them to accidently drop a stack of conventional flash cards. Also, for many children it is tempting to peek at the correct answer on the flash card without seriously attempting their own answer.

One attempted solution to the problem of "peeking" is the use of flash cards that have coded answers imprinted upon them such that the user cannot read the answer with the naked eye. As disclosed in U.S. Pat. No. 5,277,587, a user may read an uncoded question on a portion of the flash card. The user may then insert the flash card into a special holder which comprises an array of one or more openings which align with features on a camouflaged patterned portion of the flash card to reveal a coded answer (e.g., the holes align with patterned areas on the card). However, this decoding approach requires alignment and registration of the patterned openings of the decoder and the patterned features on the flash card. Consequently, the flash card needs to be carefully aligned in the decoder in order to achieve the required registration. This may make it difficult for adults to quickly insert new flash cards into the holder. Also, since small children have limited fine motor skills, false readings may result if a child does not fully insert the flash card.

Moreover, peeking is not the only problem that users have using flash cards. A generic problem with flash cards is that they are a comparatively slow, boring, learning method which does not provide sufficient stimulation and reinforcement for many users.

Children, in particular, have special educational needs which are not addressed by conventional flash cards. One problem is that children have a short attention span. Even flipping a conventional flash card over to reveal an answer on its reverse side may create too long a time delay for some small children. Many children learn better if they write out an answer rather than merely orally reciting an answer. Writing down an answer involves kinesthetic and visual modes of learning. However, writing an answer down on a separate piece of paper is inconvenient and not as efficacious as desirable. For example, if a child writes down answers on a separate piece of paper, they must glance between the paper and the correct answers. This may lead to confusion of the child, particularly if their answer sheet has numerous attempted answers written upon it after a period of study. Also, in some cases, such as while driving in a car, it may be impractical for a child to write an answer down on a separate piece of paper. Another problem with having a child write an answer on a separate piece of paper is that the child may become bored. Unless comparing their written answer with the actual answer is quick and fun, many children are likely to be quickly bored.

Flash cards are also used by adults in a variety of fields. Adults have longer attention spans than children. However, adults often use flash cards when they are tired or bored. In particular, college students in a variety of disciplines use flash cards. However, college students may easily become bored flipping through hundreds of flash cards after hours of studying. They, too, may have a tendency to "peek" at the correct answer rather than seriously working out the answer themselves. In some circumstances, such as reviewing flash cards while commuting on a train, it may be impractical to write answers down on a separate piece of paper. Also, in some subjects (e.g., biology or organic chemistry), it may be highly desirable to create a rough sketch corresponding to the subject of the flash card and to have a means to quickly compare one's sketch to the correct structure in close proximity to each other.

The learning efficacy of flash cards is not as high as desirable. Students often become bored during extended self-study drills with flash cards. There is a temptation to "peek" at the correct answers. Also, the retention rate in long term memory is often lower than desirable because students do not attempt to write down an answer to the problem. Unfortunately, no previously known flash card holder prevents peeking at the correct answer while also providing an apparatus which permits a method of using flash cards in a more efficacious manner.

What is desired is a flash card holder and method of use that improves the ability of users to efficaciously use flash cards.

SUMMARY OF THE INVENTION

The present invention is a learning device for use with an information bearing card, such as a flash card, having an uncoded challenge on one portion of the card and an optically coded response on another portion of the card. The learning device comprises a case, a receptacle coupled to the case for holding the card, and a decoding display window disposed on the surface of the receptacle for viewing the coded response on the information bearing card.

One aspect of the present invention is a learning device with a receptacle and display window arrangement that enables information bearing cards having a variety of color-coded responses to be conveniently inserted and a decoded answer viewed. The receptacle, display window, and information bearing cards may be dimensioned to accommodate the limited fine motor skills of small children.

Another aspect of the present invention is a learning device with a movable screen that enables the display window to be covered. This facilitates inserting an information bearing card into the receptacle with the decoded answer concealed from view. The user may then formulate an answer to the question on the information bearing element and then move the movable screen to reveal the decoded answer.

Yet, another aspect of the present invention is a learning device with a movable screen which has a writing surface. The movable writing screen enables the display window to be covered when the user inserts an information bearing card. It also makes it convenient for a user to write down a response on the writing screen. The movable screen may then be moved away from the display window to reveal the decoded answer in close proximity to the user's response.

Still another aspect of the present invention is a learning device with a movable writing screen that has an automatic erasure function such that the writing screen is automatically erased every time the movable writing screen is positioned to insert a new card. This reduces the chances of user confusion.

Still yet another aspect of the present invention is a learning device with a movable magnetic writing screen that utilizes a magnetic erasure element attached to a flapper coupled to the movable screen such that the magnetic erasure element is automatically translated into an erasure position when the movable writing screen is positioned to insert a new card.

BRIEF DESCRIPTION OF THE DRAWINGS

FIG. 1 is a perspective view of a flash card holder of the present invention which has a decoding display window and a movable screen.

FIG. 2 is a top view of a flash card holder of the present invention with a writing screen in a first position which covers the decoding display window.

FIG. 3 is a top view of a flash card holder of the present invention with a writing screen position which does not cover the decoding display window.

FIG. 4 is a front perspective view of a flash card holder of the present invention with an automatically erasing movable magnetic writing screen.

FIG. 5 is a rear perspective view of the flash card holder of FIG. 4 of the present invention showing a flapper means to adjust the position of a magnetic erasure element.

FIG. 6 is a rear perspective view of the flash card holder of FIG. 4 showing the flapper pivots and guides which couple the flapper to the movable magnetic screen.

DETAILED DESCRIPTION OF THE INVENTION

FIG. 1 shows one embodiment of a flash card holder of the present invention. As shown in FIG. 1, the flash card holder comprises a case 5 which is coupled to a card holder to receive and hold at least one information bearing element 10. The case 5 may be distinct from the card holder. However, as indicated by FIG. 1, the case 5 may also form part of the surface of the card holder. The information bearing element 10 has a first region 15 with an uncoded question imprinted upon it. A second optically coded region 20 is also located on the element 10. The coded region 20 prevents the user from peeking at the answer when the information bearing element 10 is disposed outside of case 5.

The coded answer on the information bearing element may be optically coded in a variety of ways. However, color coding techniques in which answers are printed in spots of one color and camouflaged from ordinary view by dots of other colors is a simple coding technique which permits the correct answer to be viewed using an inexpensive color filter which screens out the camouflage dots. Those skilled in the art of optical engineering are familiar with other optical coding means which require only a comparatively inexpensive optical filter to reveal an ordinarily hidden pattern.

A variety of card holders known to those skied in the art are within the scope of the present invention. However, a slot receptacle card holder is comparatively simple to manufacture. As shown in FIG. 1, a slot receptacle 25 is used as a card holder to hold information bearing element 10. Slot receptacle 25 has a first slot surface 30 and a slot second surface 35.

As shown in the embodiment of FIG. 1, an image decoding display window 40 is disposed on the second slot surface 35. Display window 40 preferably comprises a color filter, such as a piece of colored plastic or glass, which may be used to view camouflaged answers on the coded region 20 of information bearing element 10. The arrangement shown in FIG. 1 is comparatively inexpensive to manufacture since the display window 40 forms one surface of the slot receptacle 25 which is used as a card holder. However, the display window does not necessarily have to form one surface of the card holder. For example, the card holder could comprise a slot frame with the display window 40 disposed above the frame and coupled to the case 5. Also, while FIG. 1 shows a slot receptacle 25 which only engages the coded region 20 of information bearing element 10, the holder could have a frame-like design which engages substantially the entire card. Also, the uncoded regions might be viewed through an additional transparent window segment forming part of the receptacle.

It is desirable that the display window is slightly larger in area than the coded region 20 of the information bearing element 10. A comparatively large display window 40 utilizing an optical filter makes the holder tolerant to improper insertion. For example, a comparatively large display window 40 permits a child to view the answer without always fully and precisely inserting the information bearing element 10 into slot receptacle 25.

An optical screen element 45 is coupled to the case 5 such that it may be used to cover the display window 40. An optical screen element 45 may comprise an opaque element, such as a piece of opaque plastic, mounted on a shutter or track such that it can be moved to obstruct direct view through decoding display window 40 of coded region 20 of information bearing element 10. This permits a user to insert information bearing element 10 with the optical screen element 45 blocking the view of the coded answer 20 through decoding display window 40. The user may then consider an answer to the uncoded question 15. After considering an answer, the user may then move screen element 45 to view the correct answer through decoding display window 40.

FIGS. 2 and 3 show a second embodiment of the present invention which facilitates a user writing down an answer and comparing it with the correct response. As shown in FIG. 2, a case 50 contains a slot receptacle 55 for holding an information bearing element 60. A movable screen 65 has a writing screen element 70 disposed on the surface of the movable screen 65. A variety of writing screen elements may be used. Preferably, the movable screen 65 is sized and contoured such that it is easy for a child to grasp when the movable screen 65 is to be moved.

As shown in FIG. 2, the movable screen 65 has a first obstructing screen position which obstructs an underlying display window 85 (not shown in FIG. 2). A sliding track guide 75 may be used to move movable screen 65 over the surface of slot receptacle 55. A writing stylus 80 may be attached, by a cable or string, to case 50 to make it convenient for a user to write down an answer on writing screen element 70.

A user first inserts an information bearing element 60 with the movable screen 65 in the first obstructing screen position. As indicated in FIG. 2, with the movable screen 65 in the first obstructing screen position only the uncoded portion (e.g. "3+5") of information bearing element 60 inserted into the holder may be viewed by the user. As indicated in FIG. 2, a user may write a response (e.g., "8") on writing screen element 70.

The embodiment shown in FIGS. 2 and 3 enables a user to quickly check the accuracy of the written response. As shown in FIG. 3, after a user writes down an answer, the movable screen 65 is slid to a second screen revealing position which exposes the display window 85 to the user's view. The user may then compare the written answer to the decoded answer (e.g., "8") which is viewed through display window 85.

It is desirable that the user always starts with a clean writing screen element 70 every time a new information bearing unit is inserted into the flash card holder. This avoids potential confusion between old and new answers. As is well-known in the field of education, it is desirable that feedback be both rapid and accurate. Consequently, it is desirable to have a means by which the screen element 70 can be conveniently fully erased prior to every use.

A variety of erasable screens are known by those of ordinary skill in the art of children's toys. For example, some types of felt-tip pens may be easily erased from plastic surfaces. However, felt-tip pens can create a large mess when they are used by small children. Electrostatic or magnetic screens are another possibility. A variety of drawing toys use screens in which an image is created using electrostatic or magnetic forces acting upon small particles or flakes. Magnetic screens, for example, may be readily written upon using a magnetic stylus. A magnetic stylus is durable and has the advantage that it will not stain or mark other objects which a child may accidently touch with the magnetic stylus (e.g., the back seat of a car). Electrostatic and magnetic writing screens are commonly erased by active shaking of the screen to reorientate the particles or flakes. However, small children may not always shake such screens hard enough to achieve full erasure. Also, active shaking may be an excessive distraction and nuisance.

A magnet positioned in close proximity to a magnetic screen will reorientate the flakes or particles in the magnetic screen. However, merely attaching a magnet to the case underneath the magnetic screen would erase the magnetic screen every time the screen was moved. However, it is desirable that the user writes an answer on the magnetic screen (using a magnetic stylus) with the screen in the first obscuring screen position and then moves the screen to the second screen-revealing position with the original response preserved on the screen the that the their can be compared to the correct answer. Thus, in the present invention it is desirable that a magnetic erasure element only erase the magnetic screen when the screen is slid into position to accept a new card.

An automatic erasure function is achieved in the present invention using a magnetic screen with a magnetic erasure element whose position, relative to the back of the magnetic screen, is mechanically adjusted by the action of sliding the screen. An embodiment of a flapper mechanism which alters the separation between a magnetic erasure element and the back surface of a magnetic screen is shown in FIGS. 4, 5, and 6. As shown in FIG. 4, a movable magnetic writing screen 90 is attached to a slider 100 disposed above slot receptacle 110. The slot receptacle 110 may contain an image decoding display window comprised of a piece of colored plastic or other suitable materials. Also, as shown in FIGS. 5 and 6, a backing plate 160 may form part of the slot receptacle 110 and be used to form guides and apertures to accommodate the motion of movable screen 90 and slider 100. For example, slider 100 may comprise tabs or guide rails extending through slits along a portion of backing plate 160.

FIG. 5 is a view of the erasure mechanism from underneath the screen 90 and slot receptacle 110. A magnetic erasure element 120 is attached to a flapper 130. The moveable magnetic writing screen 90 is coupled to the flapper such that when the screen is slid from the first obstructing screen position to the second revealing-screen position, the flapper 130 keeps the erasure element 120 far enough away from the magnetic writing screen 90 that the user's answer is not erased. However, the flapper 130 is coupled to the writing screen 90 such that when the writing screen 90 is moved from the second revealing-screen position to the first obstructing-screen position, the flapper 130 moves the magnetic erasure element 120 close enough to the magnetic writing screen 90 such that the user's answer to a previous question is automatically erased.

Those of ordinary skill in the art of mechanical engineering are presumed familiar with the basic mechanical principles of flappers and various ways in which a flapper may be coupled to other mechanical elements using springs, guides, and pins. However, FIGS. 4, 5, and 6 show one coupling method using pins, pivots, and guides to selectively engage the flapper. As shown in FIG. 6, the flapper 130 has a flapper tab 140 and flapper pivot points 150. Flapper pivot point 150 enables flapper 130 to pivot about the flapper pivot points 150. The pivoting of the flapper 130 alters the relative displacement of magnetic erasure element 120 from the magnetic screen 90.

The flapper should be coupled to the magnetic writing screen 90 such that the pivot behavior of the flapper is a function of the motion of the movable writing screen 90. One way to accomplish this is to couple the slider 100 of the movable writing screen 90 to guide rails 170 extending through slits 165 in backing plate 160. As shown in FIG. 5, the flapper 130 has guide pins 180 which engage the guide rails 170. The guide pins 180 can engage the guide rail on either a first surface 174 or a second surface 176. The guide rails 170 may be shaped such that the guide pins 180 engage the first surface 174 of the guide rail 170 or the second surface 176 of the guide rail 170 depending upon the path of the slider.

Generally, there are many ways in which a flapper may be selectively engaged. For example, instead of guide pins and guide rails as shown in FIGS. 5 and 6, the flapper could have spring-loaded guide pins which only engaged the guide rails when the magnetic screen was moved from the second screen position to the first screen position. Also, the guide pins may be replaced with spring-loaded guide tabs which perform a selective engagement function. The mechanical configurations which may be used to achieve a selective engagement function to a flapper are well-known by those of ordinary skill in the art.

The physical embodiments of the flash card holder of the present invention may be used to improve the efficacy of studying with flash cards. Referring to FIGS. 2 and 3, a user inserts an information bearing unit 60 into slot receptacle 55 with the movable screen 65 in the obstructing-screen position covering display window 85 such that the coded answer is not visible. The user then formulates an answer. The convenient writing screen 70 and stylus 80 enables the user to write an answer on the blank screen 70. Writing the answer involves visual and kinesthetic modes of learning not involved in merely auditory learning. Also, a screen permits the user to draw sketches of items in response to questions. The user then pulls the screen down into the second revealing-screen position. This exposes the display window 85 such that the coded answer may be seen. As indicated in FIG. 3, the user may then see their response and the correct answer adjacent to one another, which provides quick and accurate feedback.

A flash card holder of the present invention with a magnetic writing screen and automatic erasure function makes it convenient for the user to always begin with a blank writing screen 70. The automatic erasure function is also entertaining to children. A magnetic stylus 80 which is coupled to the case 55 also makes it easy for children to use the flash card holder in a variety of locations, such as while traveling in a car.

While the inventive flash card holder has been described with particularity in regards to its usefulness in teaching children mathematics, it may have other applications as well. College students, for example, often review hundreds of flash cards to prepare for their examinations. The inventive flash card holder may be utilized to make study sessions more productive. Also, the physical apparatus of the present invention may have other entertainment applications. Many games are in the form of a written quiz question, a response by the game participants, and a comparison between the correct answer and the response of the participants. Thus, the physical apparatus and method of using the present invention may be applied to a variety of games.

In summary, the inventive flash card holder comprises a card holder and an image decoding display window. A moving screen which may be used to cover the decoding display window permits flash cards to be used in new ways. The movable screen preferably comprises a writing screen with an automatic erasure function. The present invention offers the following advantages: 1) it prevents the user from peeking at the answer before the user formulates an answer; 2) it encourages the user to write down an answer by providing a convenient, blank writing surface juxtaposed over the location where the correct answer appears; 3) it facilitates accurate feedback since the user's answer and the decoded response may be viewed in close proximity to one another; and 4) it makes the use of flash cards more enjoyable.

The description of illustrative embodiments and best modes of the present invention is not intended to limit the scope of the invention. Various modifications, alternative constructions and equivalents may be employed without departing from the true spirit and scope of the appended claims.

What is claimed is:

1. A learning device for displaying an information bearing card which has an optically coded response on a portion of the card comprising:

a) a case;
b) a card holder coupled to the case;
c) an image decoding display window coupled to the case such that a coded region of the card may be viewed through the image decoding display window when the card is placed in the card holder; and
d) a movable optical screen coupled to the case;
wherein the movable optical screen has at least two screen positions corresponding to a first obstructing screen position in which the display window is covered by the movable optical screen and a second revealing screen position in which the display window is uncovered.

2. The learning device of claim 2, wherein the writing screen comprises a magnetic writing screen.

3. The learning device of claim 2, further comprising:
a flapper connected to the case by pivots,
at least one guide pin connected to the flapper;
a magnetic erasure element attached to the flapper, the flapper positioning the magnetic erasure element adjacent to a back surface region of the movable optical screen;
a guide rail mechanically coupled to the movable optical screen and shaped to engage the at least one guide pin;
wherein the separation between the magnetic erasure element and the magnetic writing screen is decreased to a distance sufficient to erase portions of the magnetic screen proximate to the magnetic erasure element only when the movable optical screen is translated from the second revealing screen position to the first obstructing screen position.

4. The learning device of claim 3, further comprising a magnetic stylus coupled to the case.

5. The learning device of claim 2, further comprising: flapper means to automatically position a magnetic erasure element to erase the writing screen only when the magnetic writing screen is translated from the second revealing screen position to the first obstructing screen position, the flapper means also positioning the magnetic erasure element so that it does not erase the magnetic writing screen when the magnetic writing screen is translated from the first obstructing screen position to the second revealing screen position.

6. The learning device of claim 1, wherein the card holding region comprises a slot receptacle.

7. The learning device of claim 6, wherein the display window is disposed on one surface of the slot receptacle.

8. The learning device of claim 6, wherein the display window substantially forms one surface of the slot receptacle.

9. A learning device for displaying an information bearing card which has an optically coded response on a portion of the card comprising:

a) a case;
b) a receptacle coupled to the case, the receptacle dimensioned to hold the information bearing card, the receptacle having a first slot surface and a second slot surface;
c) an image decoding display window disposed on the second slot surface of the receptacle; and
d) a movable optical screen coupled to the case;
wherein the movable optical screen has at least two screen positions corresponding to a first obstructing screen position in which the display window is covered and a second revealing screen position in which the display window is uncovered.

10. The learning device of claim 9, wherein the image decoding display window is a color filter.

11. The learning device of claim 9, wherein the writing screen is a magnetic writing screen.

12. The learning device of claim 11, further comprising: flapper means to automatically position a magnetic erasure element to erase the magnetic screen only when the movable optical screen is translated from the second revealing screen position to the first obstructing screen position.

13. The learning device of claim 12, further comprising a magnetic stylus coupled to the case for writing on the magnetic screen.

14. The learning device of claim 11, further comprising:

a pivoting flapper coupled to the case by pivots;

a magnetic erasure element attached to the flapper;

at least one guide pin attached to the flapper; and guide rail means to mechanically couple the movable optical screen to the at least one guide pin;

wherein the flapper is sized and positioned to adjust the separation distance between the magnetic erasure element and the magnetic screen to erase the magnetic writing screen only when the movable optical screen is translated from the second revealing screen position to the first obstructing screen position.

15. The learning device of claim 14, further comprising:

a slider coupling the movable optical screen to the case; and a track guide attached to the case;

wherein the slider is coupled to the case by the track guide.

16. The learning device of claim 14, wherein the guide rail means comprises:

at least one guide rail having at least one surface shaped to engage the at least one guide pin.

17. A learning method for using information bearing cards having optically coded responses comprising the steps of:

a) providing a learning device comprising a card holder with an image decoding display window and a movable magnetic writing screen wherein the card holder automatically erases the magnetic writing screen only when the magnetic writing screen is moved from a position that does not obstruct the display window to a position that covers the display window;

b) moving the magnetic writing screen from a position that does not obstruct the display window to a position such that the magnetic writing screen covers the display window;

c) inserting a card into the card holder;

d) writing a response on the magnetic writing screen with a magnetic stylus; and e) moving the magnetic writing screen to reveal the decoded response in the display window.

* * * * *